(12) United States Patent
Billaud et al.

(10) Patent No.: US 7,619,557 B2
(45) Date of Patent: Nov. 17, 2009

(54) METHOD AND DEVICE FOR FILTERING A VIDEO SIGNAL RECEIVED BY A SECONDARY RADAR, PARTICULARLY IN ORDER TO ELIMINATE MODE S REPLIES

(75) Inventors: Philippe Jean Billaud, Fontenay Aux Roses (FR); Claude Rene De Volder, (Les Carrieres) Auffargis (FR)

(73) Assignee: Thales (FR)

( * ) Notice: Subject to any disclaimer, the term of this patent is extended or adjusted under 35 U.S.C. 154(b) by 454 days.

(21) Appl. No.: 10/575,085

(22) PCT Filed: Sep. 29, 2004

(86) PCT No.: PCT/EP2004/052366
§ 371 (c)(1),
(2), (4) Date: Apr. 7, 2006

(87) PCT Pub. No.: WO2005/038487
PCT Pub. Date: Apr. 28, 2005

(65) Prior Publication Data
US 2008/0231493 A1   Sep. 25, 2008

(30) Foreign Application Priority Data
Oct. 10, 2003   (FR)   .................................. 03 11894

(51) Int. Cl.
G01S 13/87    (2006.01)
G01S 7/292    (2006.01)
G01S 13/00    (2006.01)
(52) U.S. Cl. ............................. 342/40; 342/29; 342/30; 342/32; 342/36; 342/37; 342/175; 342/195
(58) Field of Classification Search ............. 342/29–51, 342/89–103, 165, 173–175, 192–197, 159–164
See application file for complete search history.

(56) References Cited

U.S. PATENT DOCUMENTS 4,334,224 A * 6/1982 Gordon ........................ 342/37

(Continued)

FOREIGN PATENT DOCUMENTS

FR   2692995 A   12/1993

(Continued)

*Primary Examiner*—Bernarr E Gregory
(74) *Attorney, Agent, or Firm*—Lowe Hauptman Ham & Berner, LLP (57) ABSTRACT

The invention applies to secondary radars. It makes it possible to carry out filtering when seeking to detect SSR responses, these SSR responses being overlapped by a mode S response. According to the invention, the pulses of the mode S response are filtered without filtering the pulses of the SSR responses which are of a higher level than the mode S response.

For this purpose, the subject of the invention is in particular a method for filtering a video signal, the video signal being received by a secondary radar, the filtering being designed to precede the detection of SSR responses, the received signal comprising samples intended to be analyzed according to the method, in which method for a sample under analysis:
  at least one instantaneous power (S4) of the received signal is estimated (T1), the power being estimated on the basis of determined signal samples, said samples at least leading or lagging by a duration greater than a duration T with respect to the sample under analysis, the duration T being the duration of an SSR response;
  a threshold (S5) is determined, the threshold being at least equal to the estimated power;
  if the power of the sample under analysis (S1') is less than the threshold, the sample is filtered.

7 Claims, 5 Drawing Sheets

U.S. PATENT DOCUMENTS

| | | | |
|---|---|---|---|
| 4,796,030 A | * | 1/1989 | Colotti et al. ............... 342/40 |
| 5,063,386 A | | 11/1991 | Bourdeau et al. |
| 5,341,139 A | * | 8/1994 | Billaud et al. ............... 342/40 |
| 5,367,303 A | * | 11/1994 | Waltz ........................ 342/37 |
| 5,455,586 A | * | 10/1995 | Barbier et al. ............... 342/37 |
| 6,191,727 B1 | * | 2/2001 | Springer et al. ............ 342/195 |

FOREIGN PATENT DOCUMENTS

WO    02/082121 A    10/2002

* cited by examiner

METHOD AND DEVICE FOR FILTERING A VIDEO SIGNAL RECEIVED BY A SECONDARY RADAR, PARTICULARLY IN ORDER TO ELIMINATE MODE S REPLIES

FIELD OF THE INVENTION

The invention relates to a method and a device for filtering a video signal received by a secondary radar, in particular for eliminating the mode S responses.

BACKGROUND OF THE INVENTION

A secondary radar (also known as an interrogator radar, surveillance radar or SSR—the acronym standing for the expression "Secondary Surveillance Radar") is a device which dispatches a train of electromagnetic pulses containing an interrogation message. The interrogation message is intended for transponders (also known as radar responders) installed in carrier vehicles such as aircraft or ships. When a transponder is in the emission lobe of the secondary radar, it receives the interrogation message. It emits in return a train of electromagnetic pulses containing a response message. The response message, intended for the secondary radar, can contain data identifying the carrier vehicle.

The interrogation and response messages are coded according to determined protocols. In the field of civil aviation, protocols called modes A, B, C and D are conventionally used for air surveillance. These protocols are defined by the standard of the ICAO (the acronym standing for "International Civil Aviation Organization"). For military surveillance, protocols called modes 1, 2, 3 and 4 are used. The mode A protocol is identical to the mode 3 protocol. Modes 3/A and C are used for air traffic control.

In mode A, the aircraft (carrier vehicles) are identified by a discrete code. A code of four digits that are strictly less than 8 (coded on 12 bits) is assigned to each aircraft, these codes being reassignable. The number of different codes is 4096. There may be a conflict if two aircraft with the same code are situated simultaneously in the emission lobe of a secondary radar.

With the increase in air traffic, the conventional protocol of secondary radars is no longer suitable:
the risk of a conflict is too significant;
responses of two aircraft situated at one and the same distance from the secondary radar may overlap (synchronous overlap); and
a secondary radar may receive responses from an aircraft, made in response to the interrogations of another secondary radar (asynchronous responses or "fruit").

In order to solve these problems, the ICAO has defined a protocol called mode S. In this protocol, the identification codes are coded on 24 bits, thereby making more than 16 million different identification codes. Moreover, mode S relies on a procedure of selective calling which consists in interrogating a single aircraft (fully identified) at a time. Hereinafter in the description, the conventional interrogations and responses will be designated by SSR interrogations and responses.

The implementation of the mode S protocol requires the replacement of existing transponders with transponders of a new type. The existing transponders being unable to be replaced simultaneously, the new secondary radars (capable of interrogating in mode S) are compatible with conventional transponders. For this purpose, the mode S secondary radars also interrogate on conventional modes (SSR interrogations) between mode S periods.

The shape of the pulses of the mode S responses being identical to those of the SSR responses, some of the pulses forming a mode S response may be regarded wrongly as an SSR response by a secondary radar. This can lead to false detections or to saturation of the processings in a secondary radar operating in conventional mode. It may be desirable then, when seeking to detect SSR responses, to filter the pulses received during the whole duration of a mode S response.

However, a mode S response may overlap SSR responses, even if the aircraft responding in conventional mode are situated at different distances. Specifically, the mode S interrogations and responses are much longer than the SSR interrogations and responses. By filtering the pulses during the whole duration of a mode S response, SSR responses are also filtered.

SUMMARY OF THE INVENTION

An aim of the invention is to filter the pulses corresponding to the mode S responses, while making it possible to detect SSR responses. According to the invention, when a mode S response is present, the pulses are filtered, except those that may correspond to SSR responses of larger power than the mode S response.

Patent FR 2 692 995 entitled "Method and device for recognizing pulses and use for the filtering of the mode S responses of a secondary radar", discloses a method for filtering mode S response. However, this method has limitations since it requires the detection and the recognition of pulses.

In order to filter mode S responses without the limitations of the prior art, the subject of the invention is in particular a method for filtering a video signal, the video signal being received by a secondary radar, the filtering being designed to precede the detection of SSR responses, the received signal comprising samples intended to be analyzed according to the method, in which method for a sample under analysis:
at least one instantaneous power of the received signal is estimated, the power being estimated on the basis of determined signal samples, said samples at least leading or lagging by a duration greater than a duration T with respect to the sample under analysis, the duration T being the duration of an SSR response;
a threshold is determined, the threshold being at least equal to the estimated power;
if the power of the sample under analysis is less than the threshold, the sample is filtered.

The invention has the advantage of using processings that are simple to implement, which tailor it to the constraints of real time execution. Moreover, it can be implemented in an analog manner, by using simple devices such as delay lines, comparators, etc.

The invention also has the advantage of making it possible to estimate the power of a response to be filtered (mode S) without necessarily having clear pulses. Specifically, the invention makes direct use of samples of signals, and not pulses. Thus, the invention can be applied even when responses to be filtered are polluted by multipaths.

The invention can be applied without ever recognizing an SSR response or a mode S response, by virtue of the use of the samples and of the specifics of the standards of the SSR and mode S signals. It makes it possible in particular:
to eliminate mode S responses, undetectable in the guise of mode S response (multipath interferences, temporal overlap with other responses . . . ), but which would constitute significant pollution for a secondary radar operating SSR mode;

to preserve the pulses of the SSR mode responses, even if these responses are not detected in the guise of SSR responses.

Thus, the invention separating filtering from detection, it is possible to perform separate tuning, including optimization of filtering and of detection.

BRIEF DESCRIPTION OF THE DRAWINGS

Other characteristics and advantages of the invention will appear on reading the following detailed description presented by way of nonlimiting illustration and given with reference to the appended figures, which represent:

FIG. 5b, the result of a peak threshold carried out over 1.6 μs of the log sigma video signal represented in FIG. 5a;

FIG. 5e, the result of a filtering according to the invention applied to the log sigma video signal represented in FIG. 5a.

DETAILED DESCRIPTION

Figure 1:
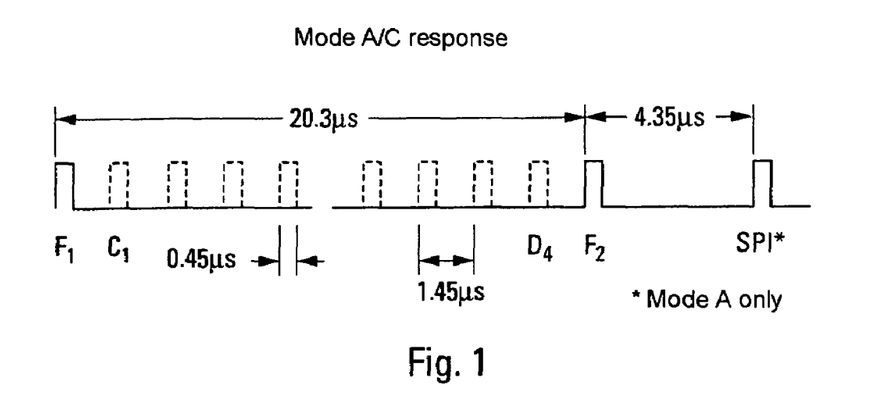
FIG. 1, an SSR response (modes A and C)

We now refer to FIG. 1 in which is represented a mode A or mode C SSR response. An SSR response is made up of a train of pulses. The pulses of this train have a standardized width of 0.45 μs. Two framing pulses $F_1$, $F_2$, separated by 20.3 μs are emitted at the start and at the end of the SSR response. Message pulses are emitted between these two framing pulses. The presence or the absence of a message pulse at a determined position makes it possible to code for a binary value 1 or 0. In the mode A responses, a last pulse called SPI (the acronym standing for the expression "Special Pulse Indicator") may be emitted 4.35 μs after the last framing pulse $F_2$. Refer to the ICAO standard (International Civil Aviation Convention—annex 10—volume IV) for further information on SSR responses.

Figure 2:
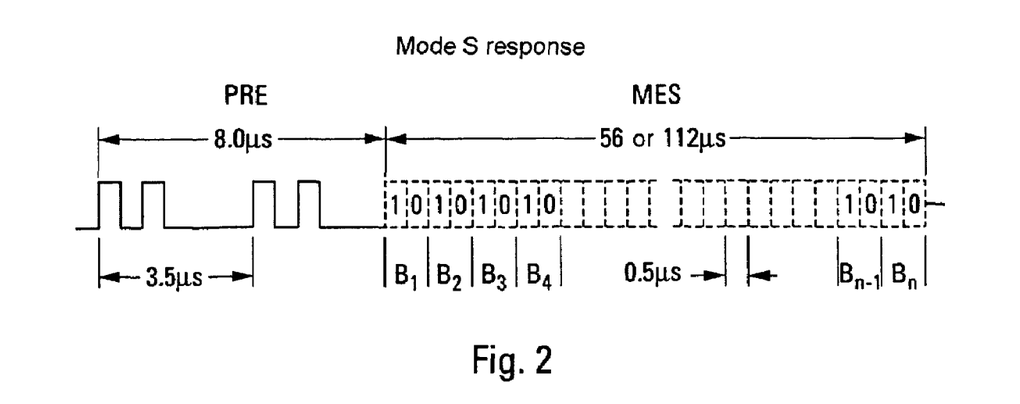
FIG. 2, a mode S response.

We now refer to FIG. 2 in which is represented a mode S response. The mode S response comprises a preamble PRE and a message MES. The preamble comprises four pulses emitted at positions determined by the ICAO standard, to which the person skilled in the art may refer. The preamble is followed by the message MES. The message MES makes it possible to code n binary values, referenced $B_1$, $B_2$ . . . $B_n$. According to the type of response (short or long), the number of binary values n may be 56 or 112. The coding used is a position coding. Stated otherwise, a pulse is emitted for each binary message value, the position of this pulse at the start or at the end of a period making it possible to code for a binary value 1 or 0. The preamble and message pulses have a standardized width of 0.5 μs. Each binary value of the message is coded over a period of 1 μs. Thus, the message of a mode S response occupies 56 or 112 μs.

Figure 3:
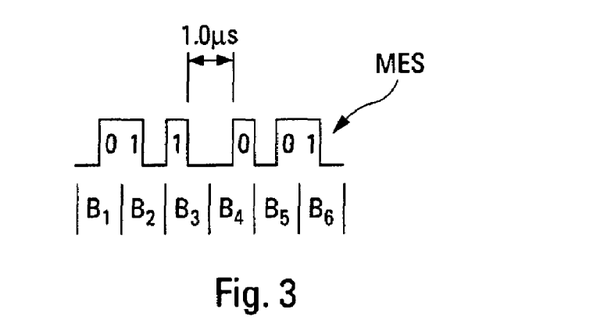
FIG. 3, an example of the start of a message of a mode S response.

We now refer to FIG. 3 in which is represented an example of the start of a message of a mode S response. In this example, the first binary values $B_1$ to $B_6$ are respectively 0, 1, 1, 0, 0, 1. The maximum time during which no pulse is emitted occurs when a value 0 follows a value 1 (between $B_3$ and $B_4$). This time is 1 μs.

Figure 4:
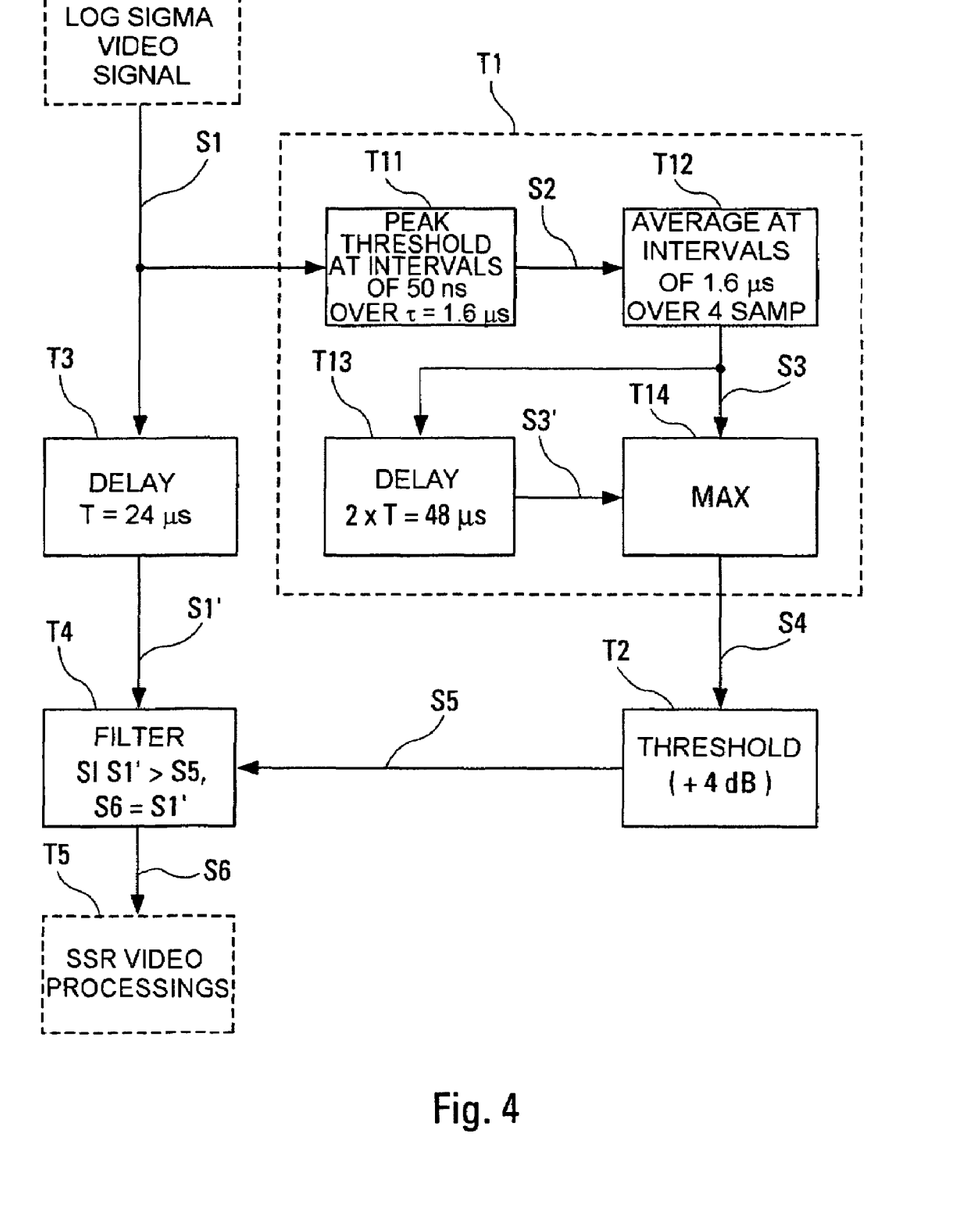
FIG. 4, a schematic of an exemplary method according to the invention.

We now refer to FIG. 4 in which is represented an exemplary implementation of the invention.

Figure 5A:
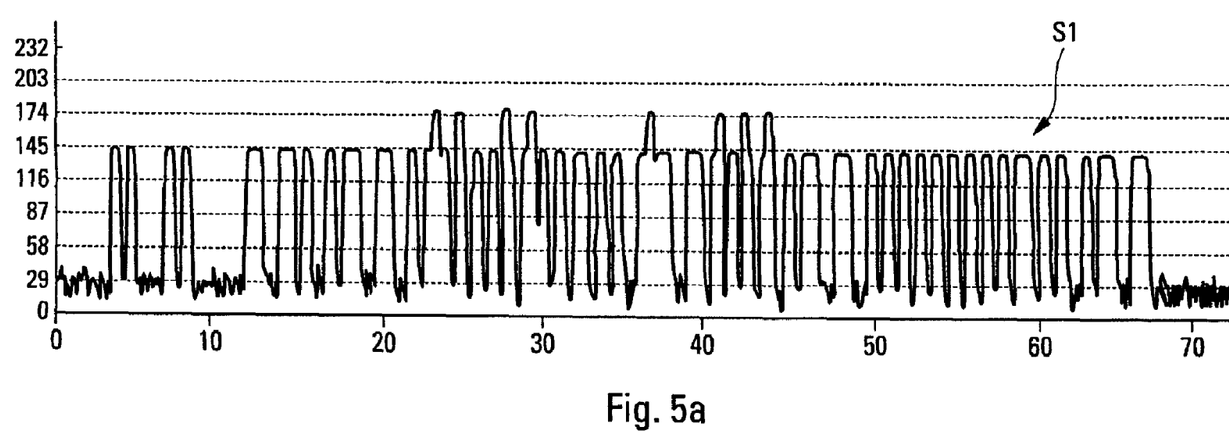
FIG. 5a, an exemplary log sigma video signal.

The invention makes it possible to process a video input signal S1 of a secondary radar receiver. This signal may be analog or digital. The method is described applied to a digital signal. The signal S1 may be a signal amplified by a logarithmic amplifier, a signal conventionally referred to as a log video signal. The signal S1 may arise from any channel of the radar. For example the method may be applied to the channel conventionally referred to as the sigma channel. This radar channel delivers a video signal representative of the amplitude of the signal received in the main reception lobe of the antenna. An exemplary signal S1 is represented in FIG. 5a.

Advantageously, the method according to the invention is applied in parallel and independently to another radar video signal (not represented). This other signal may arise from a channel conventionally referred to as the delta channel. The signal on the delta channel is representative of the angular deviation between the Radioelectric axis of the antenna of the radar and the position of the transponder in the lobe of the antenna. The sigma channel makes it possible to distinguish two signals of different powers. The delta channel makes it possible to distinguish two signals of the same power (for example when there is synchronous overlap, also known by the name of synchronous "garbling"), but whose transponders exhibit a deviation in terms of azimuthal position in relation to the secondary radar. This azimuthal deviation is then transformed into a power deviation on the delta channel, according to the transfer function of the antenna.

The input signal S1 is used to estimate, during a step T1, its instantaneous power. This estimation is carried out on the basis of determined samples of the signal S1. These samples at least lead or lag by a duration greater than a duration T with respect to the sample under analysis, the duration T being the duration of an SSR response. The duration T may be of the order of 24.6 μs (that is to say 20.3 μs for the duration of a conventional SSR response plus 4.35 μs to take account of the possible presence of an SPI pulse).

Thus, if the sample under analysis is an SSR response sample, the samples used to determine the instantaneous power are not part of this response. This makes it possible to prevent the samples of SSR responses that one is seeking to detect from contributing to the determination of the instantaneous power.

Given that the method is intended to be used in real time, it is not possible to apply a negative delay directly in order to use samples that lead with respect to the sample under analysis. A delay is therefore applied, during a step T3, to the samples under analysis so as to obtain a delayed signal S1' lagging with respect to S1. The delay applied to S1 to obtain S1' is at least equal to T. For example, a delay substantially equal to T may be applied.

We now describe an advantageous embodiment of the invention for step T1. This step T1 may comprise steps T11, T12, T13, T14 as described hereinafter.

During a first optional step T11, the peak value of the signal samples S1 received over a duration τ is determined. The duration τ is at least equal to the sum of the duration of a pulse and of the maximum duration of absence of signal in a message of a response to be filtered. When seeking to filter mode S responses, the maximum duration of absence of pulse in a message of a response is 1 μs. A message pulse has a duration of 0.5 μs. Consequently, the duration τ is at least equal to 1.5 μs. For example, the duration τ may be 1.6 μs.

During step T11, there is a need to analyze samples received during a time window with a duration τ. This induces a delay in the processing chain equal to τ/2 with respect to the sample under analysis, if one wishes the sample under analysis to be at the center of the window. In order to take account of this delay, a delay τ/2 can be added to the sample under analysis. Stated otherwise, a delay τ/2 (not represented) can be applied to the signal S1' if step T11 is carried out.

Figure 5B:
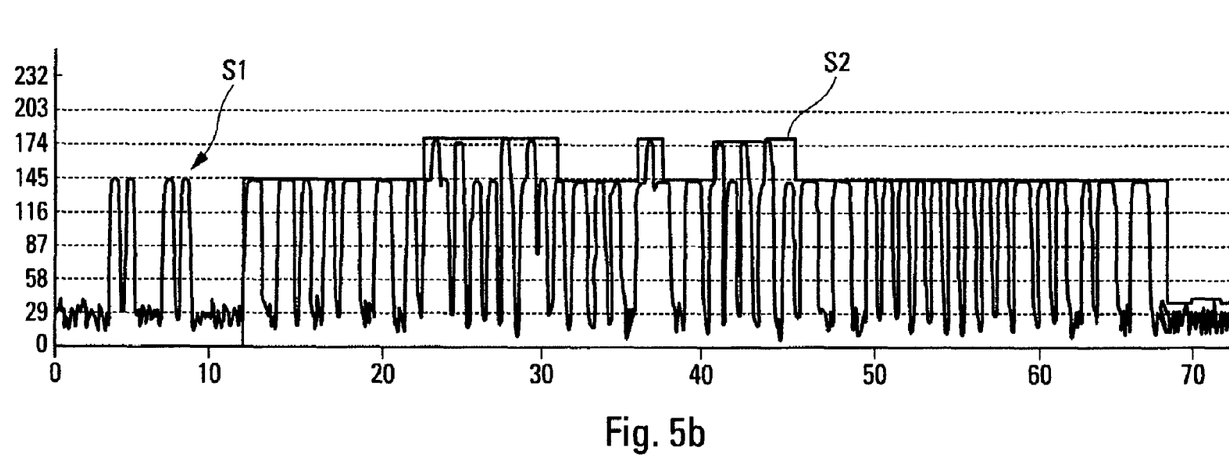

Step T11 may be applied in a continuous manner to the signal S1. It is for example possible to apply it at the sampling speed of the signal S1, for example at intervals of 50 nanoseconds. One thus obtains a signal S2, as represented in FIG. 5b. According to an embodiment, the signal S2 is undersampled, generating fewer samples.

Step T11 makes it possible to ensure, when a response to be filtered is present, that each signal sample S2 is representative of the power of a pulse. The use of samples of low level, corresponding to an absence of pulse, is thus avoided. In the presence of a response to be filtered, the signal S2 is representative of the instantaneous power of the pulses of the response.

Figure 5C:
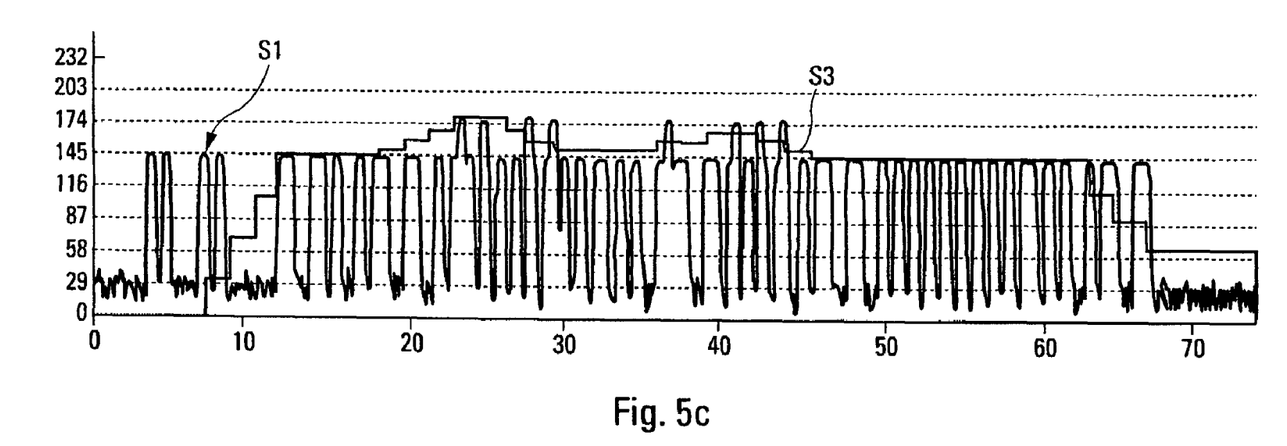
FIG. 5c, the result of a sliding average over 4 samples of the signal represented in FIG. 5b.

During a second optional step T12, an average is calculated over several samples of the signal S2. This average may be calculated over four samples of the signal S2 for example. Advantageously, these samples of the signal S2 are chosen in such a way that the signal samples S1 on the basis of which they were formulated are distinct. Stated otherwise, during step T12 the average of several successive peak values is determined, the successive peak values being at least separated by the duration τ. By "successive" is understand values taken in a sequence with a determined interval (corresponding at least to the duration τ) among the samples of the signal S2. A signal S3, as represented in FIG. 5c, is thus obtained.

During step T12, there is a need to analyze samples received during a time window with a duration 4×τ. This induces a delay in the processing chain equal to 2×τ with respect to the sample under analysis, if one wishes the sample under analysis to be at the center of the window. In order to take account of this delay, a delay 2×τ can be added to the sample under analysis. Stated otherwise, a delay τ/2+2×τ (not represented) can be applied to the signal S1' if steps T11 and T12 are carried out.

The optional step T12 makes it possible to smooth any signal spikes that may occur in the case of so-called multipath interference.

The samples used to estimate the instantaneous signal power lead with respect to the sample under analysis. It is possible to also use samples that lag with respect to the sample under analysis. For this purpose, a delay can be applied during an optional step T13. This delay is equal to the delay applied in step T3 (that is to say T in this example), to which is added an additional delay at least equal to T. For example, a delay substantially equal to 2×T can be applied during step T13. One then obtains a signal S3', delayed with respect to S3. During a step T14, the signals S3 and S3' are combined. One then obtains a signal S4 (arising from the combination), in which samples that lead and that lag with respect to the sample under analysis have been used at one and the same time.

Of course, if the optional step T12 is not applied for example, it will be understood that the same processing may be carried out by substituting the signal S2 for the signal S3.

Step T14 in the course of which the signals S3 and S3' are combined may consist for example in delivering a signal S4 equal to the maximum of the two signals S3 and S3'. By taking the maximum value of the two signals, edge effects are avoided when the sample under analysis is at the start or at the end of the message of the mode S response to be filtered. When one is at the start of the response to be filtered, the signal S3' will be based on samples situated outside the response (delayed samples, hence that lag behind the sample under analysis) while the signal S3 will be based on samples situated in the response (samples that lead, hence are in advance of the sample under analysis). Conversely, when one is at the end of the response to be filtered, the signal S3 will be based on samples situated outside the response, while the signal S3' will be based on samples situated in the response. Consequently, at least one of the two signals S3 or S3' is based on samples situated in the response to be filtered. By taking the maximum of the two signals, the signal based on samples of the response to be filtered is preserved.

Thus, on completion of step T1, that is to say of steps T11, T12, T13, T14 in the embodiment described hereinabove, a signal S4 is available which is an estimate of the instantaneous power of the signal received corresponding to the response to be filtered. If the sample under analysis is a sample of an SSR response, the delays used (steps T13 and T3) avoid influencing this estimate through samples of said SSR response.

Figure 5D:
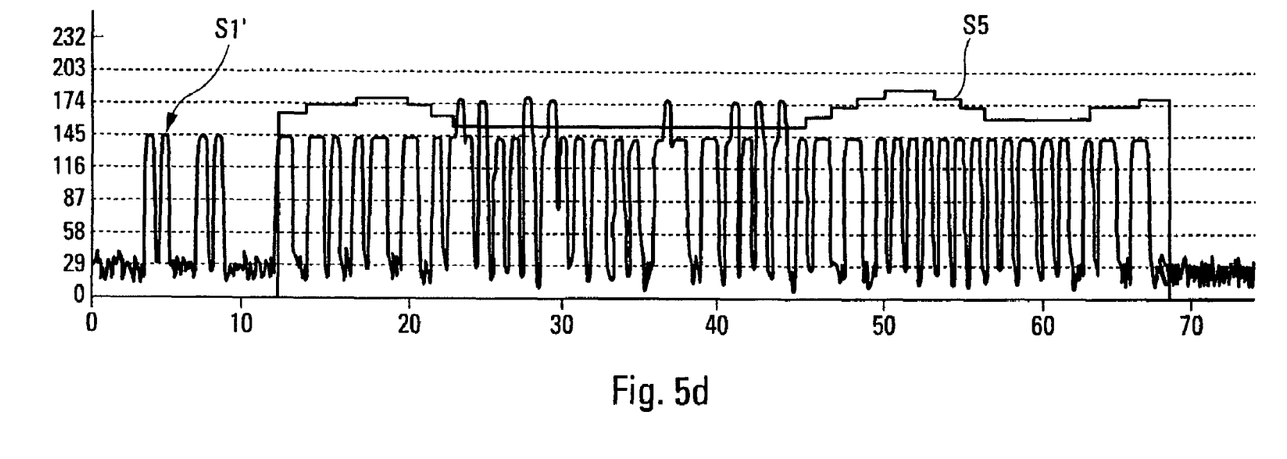
FIG. 5d, a threshold formulated on the basis of the signal represented in FIG. 5c.

Thereafter, during a step T2 a threshold S5 is determined, this threshold S5 being at least equal to the estimated power S4. The threshold S5 may be a signal formulated by adding a constant value to the signal S4 or a value proportional to the signal S4. This value may be parameterized as a function of the signal-to-noise ratio of the signal S1. It is for example possible to add 4 dB to the signal S4 to obtain S5. One thus obtains a signal as represented in FIG. 5d.

Figure 5E:
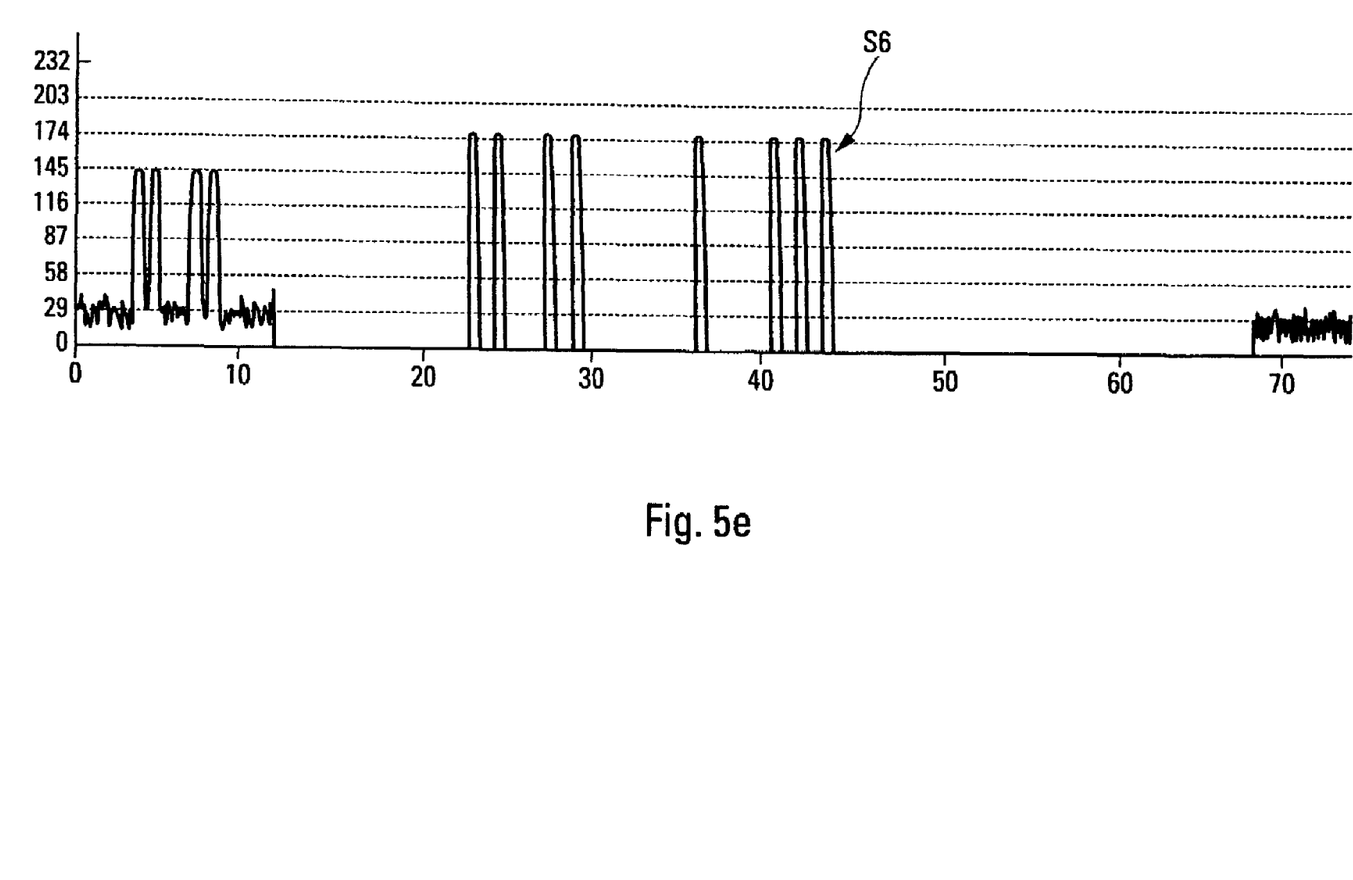

During a last step, the signals S1' and S5 are compared. If the power of the sample under analysis S1' is less than the threshold S5, the sample is filtered. Otherwise, the signal sample S1' is transmitted to the video processings T5 of the SSR responses. One thus obtains a signal S6 as represented in FIG. 5e.

When the invention is applied in parallel to the sigma and delta channels, an OR is advantageously carried out after the method according to the invention between the signals arising from each channel. Thus, if an SSR response does not have a sufficient level to stand out from the message of the response to be filtered on a channel (below 4 dB of the power of the mode S response in this exemplary embodiment), it may have a higher level on the other channel. More SSR responses can thus be transmitted.

Of course, the invention is not limited to the processing of mode A or C responses. It applies also to the processing of mode 1 or 2 responses, which have similar structures. It applies also to the processing of mode 4 responses (STANAG 4193 standard), whose structure is different.

The invention claimed is:

1. A method for filtering a video signal, the video signal being received by a secondary radar, the filtering being designed to precede the detection of SSR responses, the received signal comprising samples intended to be analyzed according to the method, comprising the steps of:
   a step during which at least one instantaneous power of the received signal is estimated, the power being estimated on the basis of determined signal samples, said samples at least leading or lagging by a duration greater than a duration T with respect to the sample under analysis, the duration T being the duration of an SSR response;
   a step during which a threshold is determined, the threshold being at least equal to the estimated power and, a step during which a sample under analysis which power is less than the threshold is filtered.

2. The method as claimed in claim 1, in which at least two instantaneous powers are estimated, a first instantaneous power being estimated on the basis of samples that lead with respect to the sample under analysis, a second power being estimated on the basis of samples that lag with respect to the sample under analysis, the threshold being at least equal to the maximum of the estimated instantaneous powers.

3. The method as claimed in claim 2, in which each instantaneous power is estimated using the peak value of the samples received for a duration $\tau$, the duration $\tau$ being at least equal to the sum of the duration of a pulse and of the maximum duration of absence of signal in a message of a response to be filtered.

4. The method as claimed in claim 3, in which each instantaneous power is estimated by averaging several successive peak values, the successive peak values being at least separated by the duration $\tau$.

5. The method as claimed in claim 3, in which the responses to be filtered being mode S responses, the sum of the duration of a pulse and of the maximum duration of absence of signal is equal to 1.5 times the modulation period of the message of a mode response.

6. The method as claimed in claim 3, in which the duration $\tau$ is substantially equal to 1.6 µs.

7. The method as claimed in claim 1, in which the duration T is substantially equal to 24.6 µs.

* * * * *